Patented Aug. 24, 1954

2,687,423

UNITED STATES PATENT OFFICE 2,687,423

PREPARATION OF LIQUID ALUMINUM ALKOXIDES

Raymond Mesirow, Chicago, Ill.

No Drawing. Application July 18, 1952,
Serial No. 299,730

24 Claims. (Cl. 260—448)

This invention relates to stabilizing of lower alkyl aluminum alkoxides to retain the same in fluid form for use, and to a solid and mixed liquid and solid form of such alkoxides wherein the solid is more readily converted to the fluid form. More particularly, the invention relates to the treatment of lower aluminum alkoxides such as aluminum triisopropoxide, aluminum tripropoxide, aluminum triethoxide, and aluminum n-butyl trialkoxide, i. e., the normally solid and difficulty fusible lower aluminum alkoxides having from 2 to 4 carbon atoms in each alkyl group by treating, preferably by blending, the solid lower aluminum alkoxide with aluminum trisecondary butoxide with the aid of heat, to produce a permanently fluid aluminum alkoxide mixture, a mixture which will remain fluid for an increased period of time, a solid aluminum alkoxide, and a mixture of liquid and solid aluminum alkoxides wherein the solids are more readily fusible to the fluid form at moderate temperatures.

As is well known, the normally solid and difficultly fusible lower aluminum alkoxides, particularly aluminum triisopropoxide, have increasing use in synthesis as a reducing reagent; as additives where organo aluminum content is desirable for various organic products; or merely as a source of aluminum or aluminum oxide such as for catalysts. These aluminum alkoxides are readily produced by reaction of aluminum metal with the corresponding alcohol in the presence of a catalyst, such as mercury or iodine or salts thereof, to form the lower aluminum alkoxides. These distill as supercooled liquids which soon crystallize to solids of relatively low fusibility, i. e. solids which fuse at temperatures above 100° C. The hard crystalline product is readily decomposed by exposure to moisture and air and is difficult to handle commercially in the absence of large quantities of solvent which usually must be removed before use. The solvent is objectionable because it increases the cost of shipping and is a source of contamination in many uses of these aluminum alkoxides.

According to this invention I have found that if an aluminum alkoxide which normally solidifies to the hard crystalline state, for example ethyl, normal or isopropyl aluminum trialkoxide, aluminum n-butyl trialkoxide, aluminum mono ethoxide dipropoxide, and other such mixed radical aluminum lower trialkoxides having one or more of these radicals and mixtures of such aluminum lower trialkoxides, has blended therewith a critical amount of aluminum trisecondary butoxide, both alkoxides being preferably in the liquid state, the mixed product will have enhanced stability as a liquid, i. e. the time during which the mixture will remain as a liquid without solidification is extended for a considerable period.

Thus I have found that where liquid aluminum isopropoxide, for example, has added thereto at least 12½% of aluminum trisecondary butoxide the product will remain liquid for several days whereas it would normally set to a solid almost immediately upon cooling to normal ambient atmospheric or room temperatures, i. e. about 20 to 30° C. I have found further that where about 40% of aluminum trisecondary butoxide has been added the mixed product is substantially permanently liquid. Enhanced liquid stability is also present for the other lower aluminum alkoxides such as ethyl and the n-butyl derivatives which merely vary slightly as to the extent of time as to which these mixtures remain liquid. I have found further that where the aluminum trisecondary butoxide is mixed with the lower aluminum alkoxide and the mixture heated for a period of about two hours at approximately 150° C., increased liquid stability is effected with slightly lesser quantities of added aluminum trisecondary butoxide. For example, a quantity as low as 5% of the additive in the mixture upon heating for two hours at 150° C. will substantially increase the length of time that the lower aluminum alkoxide remains liquid.

Moreover, I have found that a mixture of at least 5%, preferably at least 12½%, of aluminum trisecondary butoxide with one or more of the lower alkoxides besides increasing the period of liquid stability thereof reduces the fusion temperature of any solid crystals formed in storage after such treatment so that the normal lower crystalline alkoxides, which require a temperature in excess of 100° C. to fuse the same, are readily liquefied at temperatures of about 50° C.

Proceeding according to the present invention, it is merely necessary to add a desired quantity of liquid aluminum trisecondary butoxide to the liquefied aluminum lower alkoxide, and thoroughly admix the same to produce the enhanced liquid stability of this invention. A preferred procedure, however, in view of the longer time of liquid stability available with a lower quantity of aluminum trisecondary butoxide, is to add the same to the solid crystalline mass and heat the mixture to an intermediate temperature such as 125 to 175° C. for several hours, generally 1½ to 3 hours will suffice, whereby the liquid mixture thus produced will remain as a stable liquid in storage for a considerably longer period than is possible for the simple direct mixture.

Alternative procedures for effecting this mixture are possible. Thus secondary butyl alcohol may be added to one of the lower alcohols, i. e. ethanol and n-propanol, and the mixture of alcohols in the desired proportion to produce ultimate liquid stability is then converted to a mixture of aluminum alkoxides by reaction with aluminum according to methods known in the art. Alternatively, and preferably, a preformed lower aluminum alkoxide may have a desired quantity of aluminum trisecondary butoxide added thereto and the mixture distilled preferably at reduced pressure. A mixture of aluminum isopropoxide and aluminum trisecondary butoxide, for example, distills at approximately 150° C. at a pressure of 6 mm. Hg. It is often desirable in the production of any lower aluminum alkoxide to purify the same ultimately by a final distillation, but the distillation thereof is usually difficult because the lower aluminum alkoxide usually solidifies and crystallizes in the condenser and in other parts of the distillation apparatus making its handling extremely difficult, the solid lower aluminum alkoxide being a very hard crystalline substance difficult to mechanically handle and remove from the apparatus. It will be apparent, accordingly, that this procedure of joint distillation of the lower alkoxide with the aluminum trisecondary butoxide to produce a stable liquid upon distillation, is a desirable advance in the art per se, apart from its increased stability as a liquid.

It is my belief that during the heating of a lower alkoxide with aluminum trisecondary butoxide some interchange of alkoxide radicals may take place to form aluminum triisopropoxide $Al[OCH(CH_3)_2]_3$ with aluminum trisecondary butoxide $Al(OCHCH_3C_2H_5)_3$, such compounds as aluminum diisopropoxide mono secondary butoxide $Al[OCH(CH_3)_2]_2 OCHCH_3C_2H_5$ or aluminum mono isopropoxide disecondary butoxide

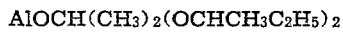
$AlOCH(CH_3)_2(OCHCH_3C_2H_5)_2$

Such compound by interchange of radicals may be formed upon distillation of the mixture or merely by heat treatment without distillation. It is significant that aluminum diisopropoxide mono secondary butoxide contains 37% of the secondary butoxide radical which compares reasonably close with the presently found upper limit of about 40% of aluminum secondary butoxide added to the mixture to maintain permanent liquid stability. Applicant, of course, does not desire to be limited by any theory of what actually takes place during admixture of the compounds with or without heat, his invention being the stabilization of lower aluminum alkoxides as pointed out above.

The following examples illustrate the practice of this invention:

Example 1

A sample of freshly prepared liquid aluminum triisopropoxide was mixed with 40% by weight of liquid trisecondary butoxide by blending without heat. Aluminum triisopropoxide, used as a control, set to a solid crystalline mass over night. The blend, however, was permanently stable, indicating no signs of crystallization after several months in storage at room temperature.

Example 2

A second control sample of aluminum triisopropoxide was heated for two hours to 150° C. and allowed to stand at room temperature (about 25° C.). It set to a solid in five days and the crystals were infusible at 100° C. A similar sample was mixed with 2½% by weight of aluminum trisecondary butoxide and heated to 150° C. for two hours. It was found to be stable for six days at room temperature and the solid formed was fusible at 100° C.

Example 3

As in Example 2, aluminum triisopropoxide of the same composition as the control of Example 2 had added thereto 5% by weight of aluminum trisecondary butoxide. The blend was heated for two hours to 150° C. and it remained stable for six days.

Example 4

A blend was made as in Example 2 by blending the aluminum triisopropoxide with 7½% of aluminum trisecondary butoxide. The blend was heated for two hours to 150° C. and it remained stable for eight days.

Example 5

Similar to Examples 2 and 4, a blend was made of 9.7% aluminum trisecondary butoxide with the same stock sample of aluminum triisopropylate. The blend was heated for two hours at 150° C. as before, and the sample remained stable for twelve days at room temperature.

Example 6

A blend was made of aluminum triisopropoxide with 12½% of aluminum trisecondary butoxide and it remained stable as a liquid after the two hour heat treatment at 150° C. for twelve days.

Example 7

A blend was made of aluminum triisopropoxide with 17½% of aluminum trisecondary butoxide, heated as before to 150° C. for two hours, and this sample remained stable as a liquid for eighteen days at room temperature.

Example 8

Three separate 21% blends of aluminum trisecondary butoxide with aluminum triisopropoxide were each heated for two hours to 150° C. The first sample was allowed to stand at room temperature after the heat treatment and remained stable as liquid for thirty days. The second blend was distilled at 150° C. under 6 mm. Hg pressure and it remained stable as a liquid for thirty-five days at room temperature. Apparently subsequent distillation gives a more stable product. The third blend was distilled like the second blend, but it was kept in a refrigerator at about 0° C., the stability thereof being apparently permanent, since no crystals formed after several months of refrigerated storage. As illustrated by this example, the refrigeration has the effect of the inhibition of crystallization indefinitely.

Example 9

A 32.7% blend of aluminum trisecondary butoxide with aluminum triisopropoxide was made, heated for two hours at 150° C., and it remained relatively stable for seventy days after which about 50% had solidified. Thus it is clearly indicated that the higher proportion of aluminum trisecondary butoxide continuously raises the period of time of liquid stability with the exception that such treatments as final distillation of the blend or maintenance under refrigerated conditions substantially improves the period of liquid stability. Thus in comparison with Example 8, a 21% blend was permanently stable when kept in the refrigerator but the present 32.7% blend was stable for only seventy days.

It is to be noted that the 40% blend as shown in Example 1 is a substantially permanently stable liquid.

*Example 10*

Four samples consisting of a 40% blend of aluminum trisecondary butoxide with aluminum triisopropoxide was made up by simple admixture of the two freshly prepared liquids. The first sample was merely allowed to stand at room temperature after homogeneous admixture as in Example 1. The second sample was distilled at 150° C. at 6 mm. pressure and then allowed to stand at room temperature. The third sample was similarly distilled at 150° C. at 6 mm. pressure but was stored in a refrigerator at about 0° C. The fourth sample was merely heated for a two hour period and then allowed to stand at room temperature. Under these conditions the last three samples remained stable as a liquid. The first sample, however, showed signs of crystallization within about 24 hours and was about 20% solid in a week. The product was about 40% solid after completion of crystallization. The crystals dissolved when heated to 50° C. and thereafter the mixture was permanently stable.

*Example 11*

A 40% mixture of aluminum secondary butoxide was made with aluminum triethoxide and the mixture was distilled at 150° C. at 6 mm. pressure. The product remained liquid after storage at room temperature for several months and is still liquid, showing no signs of solidification.

I claim:

1. A stabilized liquid blend of aluminum trisecondary butoxide with a normally solid lower aluminum trialkoxide having 2 to 4 carbon atoms in each alkoxide group, the aluminum trisecondary butoxide being present in the mixture in proportion of 5 to 40% thereof.

2. A stabilized liquid blend of aluminum trisecondary butoxide with a normally solid lower aluminum trialkoxide having 2 to 4 carbon atoms in each alkoxide group, the aluminum trisecondary butoxide being present in the mixture in proportions of 12½ to 40% thereof.

3. A stable liquid blend containing about 40% of aluminum trisecondary butoxide and a normally solid lower aluminum trialkoxide each alkoxy group containing from 2 to 4 carbon atoms.

4. A stable liquid blend comprising 40% aluminum trisecondary butoxide and about 60% of aluminum triisopropoxide.

5. A stabilized blend having enhanced tendency to remain in the liquid state formed by heating a mixture of 5 to 40% of aluminum trisecondary butoxide with a normally solid lower aluminum trialkoxide the alkoxy groups of which contain 2 to 4 carbon atoms.

6. A stabilized blend having enhanced tendency to remain in the liquid state formed by heating a mixture for several hours to a temperature below the boiling point of the components thereof, comprising 5 to 40% of aluminum trisecondary butoxide with a normally solid lower aluminum trialkoxide the alkoxy groups of which contain 2 to 4 carbon atoms.

7. A stabilized blend having enhanced tendency to remain in the liquid state formed by heating a mixture for several hours to a temperature below the boiling point of the components thereof, comprising 5 to 40% of aluminum trisecondary butoxide, the remainder being substantially aluminum triisopropoxide.

8. A stabilized blend having enhanced tendency to remain in the liquid state formed by distilling at reduced pressure a mixture of 5 to 40% of aluminum trisecondary butoxide the balance being a normally solid lower aluminum alkoxide the alkoxy groups of which contain 2 to 4 carbon atoms.

9. The process of reducing the tendency of a normally solid lower aluminum alkoxide having 2 to 4 carbon atoms in the alkoxide radical to solidify comprising blending therewith at least 5% of aluminum trisecondary butoxide.

10. The process of reducing the tendency of a normally solid lower aluminum alkoxide having 2 to 4 carbon atoms in the alkoxide radical to solidify comprising blending therewith 5 to 40% of aluminum trisecondary butoxide.

11. The process of reducing the tendency of a normally solid lower aluminum alkoxide having 2 to 4 carbon atoms in the alkoxide radical to solidify comprising blending therewith 5 to 40% of aluminum trisecondary butoxide and heating the mixture for several hours to a temperature below the boiling point thereof.

12. The process of reducing the tendency of a normally solid lower aluminum alkoxide having 2 to 4 carbon atoms in the alkoxide radical to solidify comprising blending therewith 5 to 40% of aluminum trisecondary butoxide and heating the mixture for a period of approximately two hours at a temperature of about 150° C.

13. The process of reducing the tendency of a normally solid lower aluminum alkoxide having 2 to 4 carbon atoms in the alkoxide radical to solidify comprising blending therewith 5 to 40% of aluminum trisecondary butoxide and heating the mixture to a temperature of approximately 150° C. for approximately two hours and storing the blend under refrigerated conditions.

14. The process of reducing the tendency of a normally solid lower aluminum alkoxide having 2 to 4 carbon atoms in the alkoxide radical to solidify comprising blending therewith 5 to 40% of aluminum trisecondary butoxide and distilling the mixture at reduced pressure.

15. The process of reducing the tendency of the normally solid lower aluminum alkoxides having 2 to 4 carbon atoms in the alkoxide radical to solidify comprising blending therewith 5 to 40% of aluminum trisecondary butoxide, distilling the mixture at reduced pressures, and storing the liquid mixture under refrigerated conditions.

16. The process of reducing the tendency of aluminum triisopropoxide to solidify comprising blending therewith 5 to 40% of aluminum trisecondary butoxide and distilling the mixture at reduced pressures.

17. The process of converting the solid aluminum alkoxides having 2 to 4 carbon atoms in the alkoxide radical normally fusible at temperatures above 100° C. to a mixture of liquid alkoxides and solid alkoxide crystals having a fusion point of about 50° C. comprising blending therewith 5 to 40% of aluminum trisecondary butoxide.

18. An aluminum alkoxide blend comprising 5 to 40% of aluminum trisecondary butoxide with lower aluminum trialkoxides having 2 to 4 carbon atoms selected from the group consisting of aluminum triethoxide, aluminum tri-n-propoxide, aluminum triisopropoxide, aluminum tri-n-butoxide and aluminum tri lower normally solid alkoxides having mixed radicals.

19. A stabilized liquid blend of aluminum triisopropoxide and from 5 to 40% of aluminum trisecondary butoxide.

20. A stabilized liquid blend of aluminum tri-n-butoxide and from 5 to 40% of aluminum trisecondary butoxide.

21. A stabilized liquid blend of aluminum triethoxide and from 5 to 40% of aluminum trisecondary butoxide.

22. A stabilized liquid blend of aluminum tripropoxide and from 5 to 40% of aluminum trisecondary butoxide.

23. The process of reducing the tendency of a normally solid lower aluminum alkoxide having 2 to 4 carbon atoms in the alkoxide radical to solidify comprising blending therewith at least 5% of aluminum trisecondary butoxide and heating the mixture at a temperature below the boiling point thereof.

24. The process of reducing the tendency of a normally solid lower aluminum alkoxide having 2 to 4 carbon atoms in the alkoxide radical to solidify comprising blending therewith 5 to 40% of aluminum trisecondary butoxide and heating the mixture at a temperature below the boiling point thereof.

References Cited in the file of this patent

FOREIGN PATENTS

| Number | Country | Date |
|--------|---------|------|
| 289,157 | Germany | Feb. 1914 |

OTHER REFERENCES

Tischtschenko, Centralblat 1900, Part I, pages 10–12.

Kamm, Qualitative Organic Analysis, 2nd edition, pages 10–11 (1932).